United States Patent
Kim et al.

(10) Patent No.: US 11,766,779 B2
(45) Date of Patent: Sep. 26, 2023

(54) MOBILE ROBOT FOR RECOGNIZING QUEUE AND OPERATING METHOD OF MOBILE ROBOT

(71) Applicant: LG ELECTRONICS INC., Seoul (KR)

(72) Inventors: Kang Uk Kim, Seoul (KR); Minjung Kim, Seoul (KR); Yeonsoo Kim, Seoul (KR); Hyoungrock Kim, Seoul (KR); Hyoung Seok Kim, Seoul (KR); Dong Ki Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 489 days.

(21) Appl. No.: 16/866,394

(22) Filed: May 4, 2020

(65) Prior Publication Data
US 2020/0262071 A1 Aug. 20, 2020

Related U.S. Application Data (63) Continuation-in-part of application No. PCT/KR2019/005101, filed on Apr. 26, 2019.

(51) Int. Cl.
*G06F 19/00* (2018.01)
*B25J 9/16* (2006.01)
(Continued)

(52) U.S. Cl.
CPC ............. *B25J 9/1669* (2013.01); *B25J 9/161* (2013.01); *B25J 9/162* (2013.01); *B25J 9/1664* (2013.01);
(Continued)

(58) Field of Classification Search
CPC ........ G06V 20/53; G06V 10/82; G06V 40/10; G06V 20/52; G06V 10/764;
(Continued)

(56) References Cited

U.S. PATENT DOCUMENTS 5,959,055 A * 9/1999 Le Blevec ................. C08J 5/18
526/318.42
8,131,010 B2 * 3/2012 Senior .................... G06V 20/53
348/149
(Continued)

FOREIGN PATENT DOCUMENTS

CN 103916641 7/2014
KR 1020170021799 2/2017
(Continued)

OTHER PUBLICATIONS

PCT International Application No. PCT/KR2019/005101, International Search Report dated Aug. 7, 2019, 4 pages.

*Primary Examiner* — Abby Y Lin
*Assistant Examiner* — Sohana Tanju Khayer
(74) *Attorney, Agent, or Firm* — LEE, HONG, DEGERMAN, KANG & WAIMEY PC (57) ABSTRACT

Disclosed is a moving robot capable of recognizing a waiting line and a method for controlling the same. One embodiment provides a method for operating a moving robot, the method comprising: starting moving from a predefined moving start point toward a predefined moving end point; acquiring a waiting line region image by photographing a predefined waiting line region during the moving; searching for an end point of a waiting line formed in the waiting line region using the waiting line region image; terminating the moving when the end point of the waiting line is detected; setting an operation mode based on a length of the waiting line calculated using the end point of the waiting line; and operating in the set operation mode while returning to the moving start point.

20 Claims, 9 Drawing Sheets

(51) Int. Cl.
*B25J 13/00* (2006.01)
*B25J 19/02* (2006.01)
*B25J 13/08* (2006.01)
*B25J 11/00* (2006.01)

(52) U.S. Cl.
CPC ........... *B25J 9/1679* (2013.01); *B25J 11/008* (2013.01); *B25J 13/003* (2013.01); *B25J 13/08* (2013.01); *B25J 19/023* (2013.01)

(58) Field of Classification Search
CPC . G06T 2207/30242; G06T 2207/20084; G06T 2207/30196; B25J 11/008; B25J 19/023; B25J 9/1669; B25J 9/161; B25J 9/162; B25J 9/1664; B25J 9/1679; B25J 13/003; B25J 13/08; Y10S 901/01
See application file for complete search history.

(56) References Cited

U.S. PATENT DOCUMENTS

| | | | | |
|---|---|---|---|---|
| 10,362,459 | B1* | 7/2019 | Jones | H04W 4/20 |
| 2003/0107649 | A1* | 6/2003 | Flickner | G06T 7/292 |
| | | | | 348/169 |
| 2007/0253595 | A1* | 11/2007 | Sorensen | G07C 9/00 |
| | | | | 382/103 |
| 2009/0034797 | A1* | 2/2009 | Senior | G06V 20/54 |
| | | | | 382/104 |
| 2009/0034846 | A1* | 2/2009 | Senior | G06V 20/53 |
| | | | | 382/190 |
| 2013/0096977 | A1* | 4/2013 | Finch | G06V 20/53 |
| | | | | 705/7.26 |
| 2014/0180479 | A1* | 6/2014 | Argue | B65B 5/105 |
| | | | | 901/47 |
| 2016/0021344 | A1* | 1/2016 | Renkis | G08B 13/00 |
| | | | | 901/1 |
| 2017/0098337 | A1 | 4/2017 | Galley et al. | |
| 2018/0003516 | A1* | 1/2018 | Khasis | G08G 1/207 |
| 2019/0361513 | A1* | 11/2019 | Tomoda | H04M 1/73 |

FOREIGN PATENT DOCUMENTS

| | | |
|---|---|---|
| KR | 101803081 | 11/2017 |
| KR | 1020180040908 | 4/2018 |
| WO | 2017047060 | 3/2017 |

\* cited by examiner

MOBILE ROBOT FOR RECOGNIZING QUEUE AND OPERATING METHOD OF MOBILE ROBOT

CROSS-REFERENCE TO RELATED APPLICATIONS

This application is a continuation in part of International Application PCT/KR2019/005101 with an international filing date of Apr. 26, 2019, currently pending, which claims the benefit of earlier filing date and right of priority to Korean Patent Application No. 10-2018-0067089, filed on Jun. 11, 2018, the contents of which are all hereby incorporated by reference herein in their entirety.

BACKGROUND

1. Technical Field

The present disclosure relates to a moving robot capable of recognizing a waiting line and a method for controlling the same.

2. Description of the Related Art

A robot is a machine that automatically handles on a given task or operates by its own capabilities. The robot has been used in industry primarily for purpose of automating human-manual tasks. However, in recent years, development of intelligent robots that may interact with humans beyond the just industrial robot has been actively conducted.

Such the intelligent robots are widely used in various fields. In particular, a moving robot which provides useful information and functions to users while moving in public places such as airports, train stations, ports, department stores, marts, and performance halls, has attracted attention. A typical function of the moving robot may be a route guidance function for guiding the user along a route from a public place to a destination.

Figure 1:
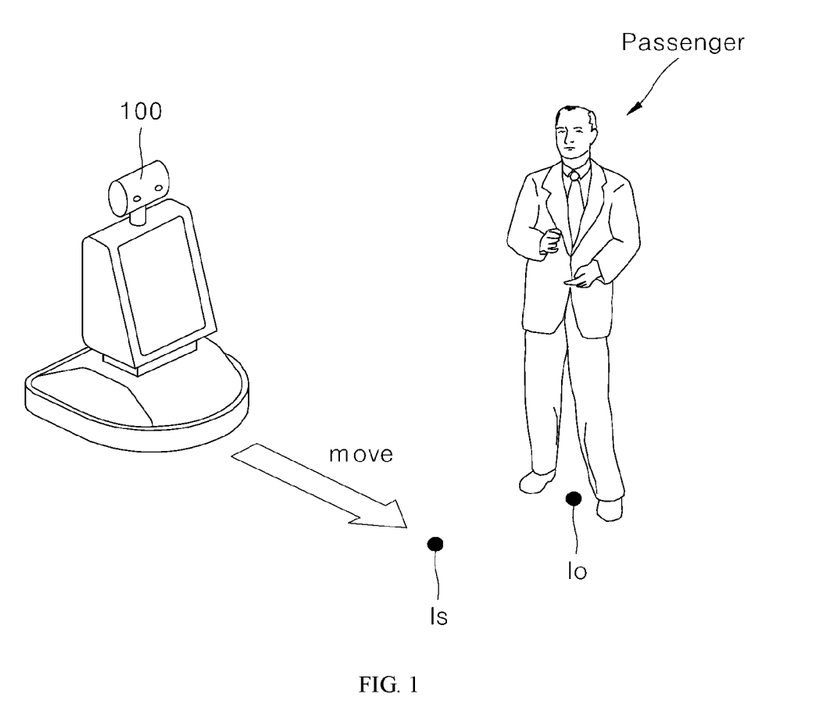
FIG. 1 is a view showing an operation of an airport robot according to the prior art.

For example, Korean Patent Application Publication No. 10-2018-0040839 discloses an airport robot that provides a guide function to a boarding gate area for passengers in an airport. FIG. 1 is a view showing an operation of an airport robot according to Korean Patent Application Publication No. 10-2018-0040839.

Referring to FIG. 1, the airport robot 100 compares a face image of a passenger existing in an image acquired by a camera with a reference face image of a passenger to search for a passenger to receive a route guidance function.

When from the search result, the passenger is recognized, the airport robot 100 calculates a location lo of the passenger based on the image information, and moves to a target position ls corresponding to the location lo of the passenger. In this connection, the airport robot 100 generates movement route information to a flight to be boarded by the target person.

The airport robot 100 moved to the target position ls displays the movement route information on a display thereof, and moves along the movement route to guide the passenger to a boarding gate of the scheduled flight.

In one example, in a public place, a waiting line is created by multiple users lining up for ticketing, immigration examination, entry and payment. When a user belonging to such a waiting line does not properly understand information related to his or her waiting purpose, there is a problem in that a time required for ticketing, immigration inspection, entry, payment, etc. becomes long.

Further, in a public place where a large number of waiting lines are formed, conventionally, there is no means to accurately determine a length of each waiting line or provide information about the length of each waiting line directly to users who are in the waiting line or who want to join the waiting line. As a result, a user who belongs to the waiting line or a user who wants to join the waiting line in a public place is experiencing inconvenience.

SUMMARY

A purpose of the present disclosure is to provide a moving robot that may provide useful information related to a waiting purpose to an user in a waiting line, and a method of controlling the moving robot.

Further, another purpose of the present disclosure is to provide a moving robot that may accurately identify a length of each waiting line when multiple waiting lines exist and provide information about the length of each waiting line, and method of controlling the moving robot.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

In one embodiment of the present disclosure, there is provided a method for operating a moving robot, the method comprising: starting moving from a predefined moving start point toward a predefined moving end point; acquiring a waiting line region image by photographing a predefined waiting line region during the moving; searching for an end point of a waiting line formed in the waiting line region using the waiting line region image; terminating the moving when the end point of the waiting line is detected; setting an operation mode based on a length of the waiting line calculated using the end point of the waiting line; and operating in the set operation mode while returning to the moving start point.

In another embodiment of the present disclosure, there is provided a moving robot comprising: an image acquisition unit configured to generate a waiting line region image by photographing a predefined waiting line region; a driving unit configured to move the moving robot along a predetermined moving route; and a controller configured to set an operation mode and the moving route of the moving robot based on the waiting line region image.

In this connection, the controller may be configured to: control the move assembly such that the moving robot starts moving from a predefined moving start point toward a predefined moving end point; control the image acquisition unit to acquire the waiting line region image during the moving; search for an end point of a waiting line formed in the waiting line region using the waiting line region image; control the move assembly such that the moving robot terminates the moving when the end point of the waiting line is detected; set the operation mode based on a length of the waiting line calculated using the end point of the waiting line; control the move assembly such that the moving robot returns to the moving start point; and control the moving robot to operate in the set operation mode while returning to the moving start point.

In accordance with the present disclosure, a moving robot may provide useful information related to a waiting purpose to an user in a waiting line.

Further, in accordance with the present disclosure, a moving robot may accurately identify a length of each waiting line when multiple waiting lines exist and provide information about the length of each waiting line.

DETAILED DESCRIPTIONS

The above objects, features, and advantages will be described in detail with reference to the accompanying drawings Accordingly, a person having ordinary knowledge in the technical field to which the present disclosure belongs may easily implement a technical idea of the present disclosure. In describing the present disclosure, when it is determined that a detailed description of a known component related to the present disclosure may unnecessarily obscure a gist of the present disclosure, the detailed description will be omitted. Hereinafter, exemplary embodiments of the present disclosure will be described in detail with reference to the accompanying drawings. In the drawings, the same reference numerals are used to indicate the same or similar components.

Figure 2:
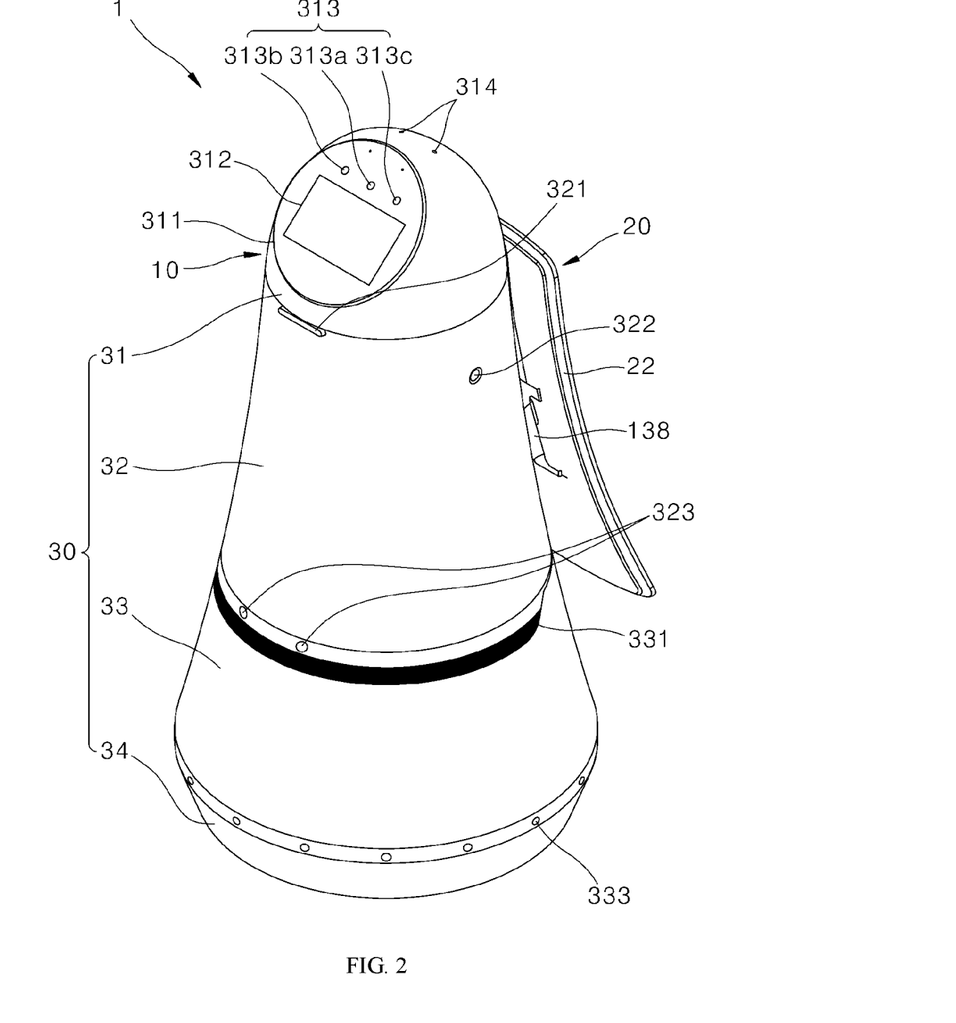
FIG. 2 illustrates an appearance of a moving robot according to an embodiment of the present disclosure.

FIG. 2 illustrates an appearance of a moving robot according to an embodiment of the present disclosure.

Referring to FIG. 2, a moving robot 1 according to an embodiment of the present disclosure includes a main body 10 forming an appearance and accommodating various components therein. The main body 10 is formed to be elongate in a vertical direction. A shape of the main body 2 tapers toward a top. For reference, a shape of the main body 10 shown in FIG. 2 is only one example. Thus, the shape of the main body 10 may vary depending on applications.

The main body 10 includes a casing 30 that forms an exterior appearance of the moving robot 1. The casing 30 may include a top cover 31, a first middle cover 32 disposed below the top cover 31, a second middle cover 33 disposed below the first middle cover 32, and a bottom cover 34 disposed below the second middle cover 33. In this connection, the first middle cover 32 and the second middle cover 33 may be integrally formed with each other.

The top cover 31 is located at a top of the moving robot 1 and may have a hemisphere or dome shape. The top cover 31 may be positioned at a vertical level lower than a height of an adult to facilitate input of commands from an user. Further, the top cover 31 may be configured to be rotatable by a predefined angle.

An user interface 311 may be formed on a front face of the top cover 31. The user interface 311 receives a command from the user. To this end, the user interface 311 may include a display 312 for receiving a touch input from the user.

Hereinafter, the display 312 of the user interface 311 may be referred to as a head display 312, while a display 20 disposed on the body may be referred to as a body display 20.

The head display 312 may be embodied as a touch screen forming a layer structure with a touch pad. The head display 312 may be used as an input device capable of receiving information via a user's touch in addition to an output device.

The user interface 311 may be inclined upwards at an angle so that the user may easily manipulate the user interface while looking down the head display 312. For example, the user interface 311 may be disposed at a face where a portion of the top cover 31 is cut off.

In another example, the user interface 311 may have a circular or oval shape as a whole. For example, the user interface 311 may have a circular shape. One or more structures to represent a human eye, nose, mouth, eyebrow, and the like may be disposed on the user interface 311. That is, a specific structure may be disposed or a specific image to express a human eye, nose, mouth, eyebrow, and the like may be formed on the user interface 311. As such, the user interface 311 may have a human face shape to provide an emotional feeling to the user. Furthermore, when a robot having a human face shape travels, this may give a feeling as when a person is moving, thereby generating a friendship with the robot.

As another example, one or more images for representing a human eye, nose, mouth, eyebrow, etc. may be displayed on the head display 312. That is, not only information related to a route guidance service but also various images for expressing a shape of a face of a person may be displayed on the head display 312. Then, an image for expressing a predetermined facial expression may be displayed on the head display 312 at a predetermined time interval or at a specific time.

In one example, in FIG. 1, a direction in which the user interface 311 faces may be defined as a "forward" direction, while an opposite direction thereto is defined as a "rear" direction.

Further, a head camera 313 for recognition of people or objects may be adjacent to the user interface 311.

The head camera 313 may be disposed above the head display 312. The head camera 313 may include a 2D camera 313*a* and RGBD (Red, Green, Blue, Distance) sensors 313*b* and 313*c*.

The 2D camera 313*a* may act as a sensor for recognizing a person or an object based on a 2D image.

Further, each of the RGBD sensors 313*b* and 313*c* may be a sensor for acquiring a position or face image of a person. Each of the RGBD sensors 313*b* and 313*c* may detect a person or object using a captured image having depth data as obtained from a camera with RGBD sensors or other similar 3D imaging device.

In order to accurately detect a position or face image of a person, a plurality of RGBD sensors 313b and 313c may be disposed. For example, as shown in FIG. 1, two RGBD sensors 313b and 313c may be respectively arranged on left and right sides to the 2D camera 313a.

Although not shown, the user interface 311 may further include a physical button for directly receiving a command from the user.

Further, a microphone 314 may be disposed on the top cover 31. The microphone 314 receives a voice command spoken from the user. To accurately receive the user's voice command, a plurality of microphones 314 may be placed at multiple top points of the top cover 31 respectively. Accordingly, while the moving robot 1 is moving or the top cover 31 is rotating, the user's voice command may be correctly input.

In one embodiment of the present disclosure, when the moving robot 1 is moving, the top cover 31 may be rotated such that the user interface 311 faces in a moving direction. Then, when the moving robot 1 receives a command (e.g., voice command) from the user while moving, the top cover 31 may be rotated such that user interface 311 faces toward the user.

In contrast, when the moving robot 1 receives a command from the user while moving, the top cover 31 may be rotated in a direction opposite to the moving direction of the moving robot 1. That is, the top cover 31 may be rotated toward the body display 20. Accordingly, the user may manipulate the user interface 311 while viewing the route guidance service information displayed on the body display 20.

Referring back to FIG. 1, the body display 20 may be formed in an elongate manner in a vertical direction on a rear face of the moving robot 1 opposite to the user interface.

The body display 20 may be disposed behind the first middle cover 32. The body display 20 displays information related to a service currently being provided (e.g., airport gate query information, route guidance service information, etc.).

The body display 20 may be configured as a curved display having a predetermined curvature shape. That is, the body display 20 may have a concave shape as a whole. Then, the body display 20 may be inclined rearwards as it goes downwardly. That is, a spacing between the body display 20 and the casing 30 may increase as it goes from a top to a bottom.

A support 22 may perform a function of keeping the body display 20 to be positioned behind the first middle cover 32. The support 22 may extend from a back face of the body display 20. The support 22 may be elongated in a vertical direction on the back of the body display 20 and may be inclined rearwards as it goes downwardly.

Inside the main body 10, a fixed member 138 may be provided to fix the body display 20 to the main body 10. The fixed member 138 may have one end fixed to the main body 10 and the other end fixed to the body display 20.

Referring back to FIG. 1, the first middle cover 32 includes an RGBD sensor 321.

The RGBD sensor 321 may perform a function of detecting a collision between the moving robot 1 and an obstacle while the moving robot 1 is moving. To this end, the RGBD sensor 321 may face in a direction in which the moving robot 1 travels, that is, may be in front of the first middle cover 32. For example, the RGBD sensor 321 may be located on the top of the first middle cover 32 in consideration of an obstacle present in front of the moving robot 1 or of a height of a person However, the position of the RGBD sensor 321 is not limited thereto. The RGBD sensor 321 may be disposed at various positions in front of the first middle cover 32.

According to an embodiment, the RGBD sensor 321 is not disposed in front of the first middle cover 32, the function of the RGBD sensor 321 may be performed by the head camera 313.

Further, the first middle cover 32 further includes a hole 322 for a speaker.

The speaker hole 322 may be configured for transmitting a sound generated from the speaker to an outside. The speaker hole 322 may be formed in an outer circumferential surface of the first middle cover 32 or may be formed in a singular number. Alternatively, however, a plurality of speaker holes 322 may be spaced apart from each other and may be arranged on the outer circumferential surface of the first middle cover 32.

Further, the first middle cover 32 further includes a hole 323 for a stereo camera.

The hole 323 for the stereo camera may be defined for operating a stereo camera (not shown) installed inside the main body 10. For example, the hole 323 for the stereo camera may be formed at a front lower end of the first middle cover 32. Accordingly, the stereo camera 137 may photograph a front region of the moving robot 1 through the hole 323 for the stereo camera.

Further, the second middle cover 33 includes a first cut away 331.

The first cut away 331 may be formed laterally in a front face of the outer circumferential surface of the second middle cover 33. The first cut away 331 may be formed by cutting away a portion of the second middle cover 33 so that a front lidar sensor (not shown) is operable.

Specifically, the first cut away 331 may be cut to a predetermined length in a radial direction from a front outer peripheral surface of the second middle cover 33. In this connection, the front lidar 136 is located inside the second middle cover 33. Then, the first cut away 331 may be formed by cutting a circumferential portion of the second middle cover 33 in the outer circumferential surface of the second middle cover 33 corresponding to a position of the front lidar. That is, the first cut away 331 and the front lidar may face each other. Thus, the front lidar may be exposed to an outside through the first cut away 331.

In one example, the first cut away 331 may be cut away by 270 degrees along the perimeter in the front face of the second middle cover 33. A reason why the first cut away 331 should be formed in the second middle cover 33 is to prevent a laser emitted from the front lidar from being directly irradiated into an eyes of an adult or a child.

Further, an ultrasonic sensor 333 may be disposed on the second middle cover 33. The ultrasonic sensor 333 may be configured for measuring a distance between an obstacle and the moving robot 1 using an ultrasonic signal. The ultrasonic sensor 333 may perform a function for detecting an obstacle in proximity to the moving robot 1.

For example, a plurality of the ultrasonic sensors 333 may be arranged in a circular manner in order to detect obstacles as close to the moving robot 1 in all directions. The plurality of ultrasonic sensors 333 may be arranged at a regular spacing along a circumference of a lower end of the second middle cover 33.

Referring back to FIG. 1, the bottom cover 34 may be disposed below the second middle cover 33. Unlike the first middle cover 32 and the second middle cover 33, the bottom cover 34 may have a cylindrical shape that decreases in diameter from a top to a bottom. That is, the main body 10 has a shape of a tumbler as a whole, thereby reducing an amount of impact applied to the robot in an collision event. A bottom portion of the main body 10 has an inwardly recessed structure to prevent human feet from getting caught in the robot's wheels.

A driving unit is disposed inside the bottom cover 34. The mover assembly includes one or more wheels of the moving robot 1 and a motor for transmitting power to the wheels. The driving unit may include a plurality of wheels. In this case, the number of motors may vary depending on the number and arrangement of the wheels.

The shape of the moving robot in FIG. 2 is exemplary. The present disclosure is not limited thereto. Further, the cameras and sensors of the moving robot 1 may be placed in various positions of the moving robot 1 different from positions FIG. 1.

Figure 3:
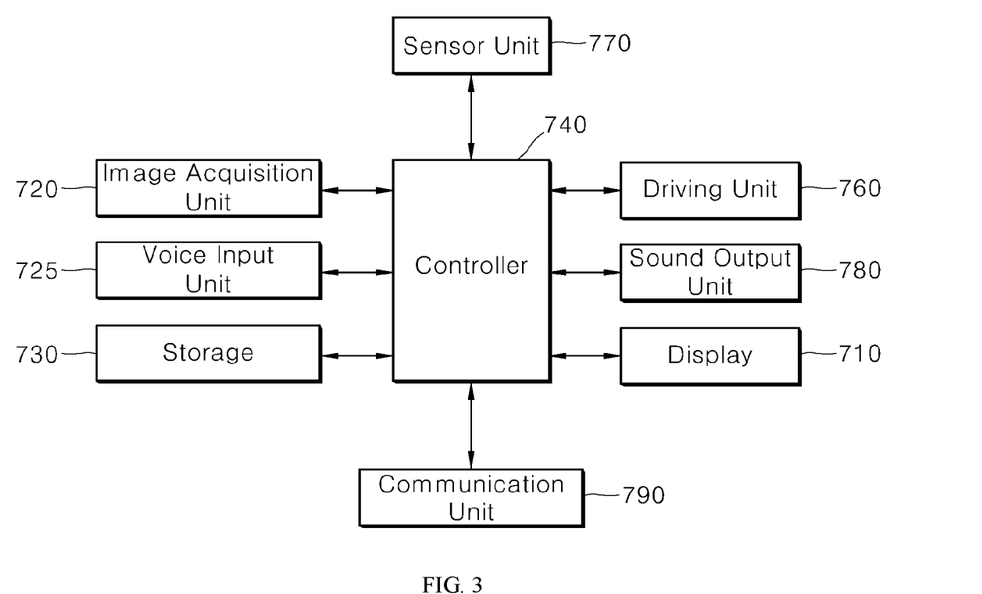
FIG. 3 is a block diagram schematically showing a configuration of a moving robot according to an embodiment of the present disclosure.

FIG. 3 is a block diagram schematically showing a configuration of a moving robot according to an embodiment of the present disclosure.

Referring to FIG. 3, the moving robot 1 according to an embodiment of the present disclosure includes a voice input unit 725 for receiving a user's voice command, storage 730 for storing various data, a communication unit 790 for exchanging data with other electronic devices, and a controller 740 that controls an operation of the moving robot 1.

The voice input unit 725 may include a processing unit for converting analog sound into digital data or may be connected to a processing unit to convert the voice command to data so that the user's voice command may be recognized by the controller 740 or a control server (not shown).

The controller 740 may control an operation of the moving robot 1 by controlling the voice input unit 725, the storage 730, and the communication unit 790 constituting the moving robot 1.

The storage 730 stores various types of information necessary for controlling the moving robot 1 and may include a volatile or nonvolatile recording medium. The recording medium stores data that may be read by a microprocessor, and may include HDD (Hard Disk Move), SSD (Solid State Disk), SDD (Silicon Disk Move), ROM, RAM, CD-ROM, magnetic tape, floppy disk, optical data storage devices and the like.

Further, the storage 730 may store various data necessary for the moving robot 1 to provide the guidance service to the user.

Further, the controller 740 may transmit the operation status or user input of the moving robot 1 to the control server (not shown) or another moving robot through the communication unit 790.

The communication unit 790 includes at least one communication module to allow the moving robot 1 to be connected to the Internet or a predetermined network In one example, the storage 730 may store therein data for voice recognition. The controller 740 may process a voice command of a user received through the voice input unit 725 and perform a voice recognition process. The controller 740 may control the moving robot 1 to perform a predetermined operation based on the voice recognition result.

In one example, when the voice command requests predefined information such as flight departure information and tour guide information, the controller 740 may display, on the display 710, the predefined information such as flight departure information and tour guide information.

Further, when the user requests a route guide, the controller 740 may control the robot to escort the user to a guide destination selected by the user.

In one example, the voice recognition process may be performed in a control server (not shown) rather than the moving robot 1 itself.

In this case, the controller 740 may control the communication unit 790 such that a user input voice signal is transmitted to the control server (not shown), and then may receive a recognition result for the voice signal from the control server (not shown) through the communication unit 790.

According to an embodiment, a simple voice recognition such as call word recognition may be performed by the moving robot 1, while higher level voice recognition such as natural language processing may be performed by the control server (not shown).

In one example, the moving robot 1 may include a display 710 for displaying the predefined information in an image form and a sound output unit 780 for outputting the predefined information in an audio form.

The display 710 may display information corresponding to the request input of the user, a processing result corresponding to the request input of the user, an operation mode, an operation state, an error state, and the like in an image form.

Then, the sound output unit 780 may output a sound corresponding to the information displayed on the display 710. Further, the sound output unit 780 may output a warning sound, an operation mode, an operation state, a sound message informing an error state, information corresponding to a user's request input, and a processing result corresponding to the user's request input in the audio form under the control of the controller 740. The sound output unit 780 includes a speaker that converts an electrical signal from the controller 740 into an audio signal and outputs the audio signal.

The display 710 may include the head display 312 and the body display 21 shown in FIG. 2. The body display 21 may be implemented to have a screen larger than the head display 312.

In one example, the moving robot 1 includes an image acquisition unit 720 that may capture a predefined spatial range.

The image acquisition unit 720 may capture surroundings of the moving robot 1 and external environment, and may include a camera module. Multiple cameras may be installed in various positions for photographing efficiency.

For example, the image acquisition unit 720 may include the head camera 313 for recognizing a person and an object and the body camera 25 for identification and tracking of a guide object as shown in FIG. 1. However, the number, arrangement, type, and shooting spatial range of the cameras included in the image acquisition unit 720 are not necessarily limited thereto.

In accordance with the present disclosure, the image acquisition unit 720 may generate a waiting line region image by shooting a predefined waiting line region. The controller 740 may detect an end point of the waiting line, a length of the waiting line, or the number of people belonging to the waiting line based on the waiting line region image generated by the image acquisition unit 720.

Further, the controller 740 may set an operation mode of the moving robot 1 based on the waiting line region image generated by the image acquisition unit 720 and control the moving robot 1 to operate according to the set operation mode.

The waiting line region image generated by the image acquisition unit 720 may be stored in the storage 730.

Further, the moving robot 1 includes the driving unit 760 for moving the moving robot 1. As described above, the driving unit 760 includes one or more wheels and a motor for transmitting power to the wheels.

Further, the moving robot 1 includes a sensor unit 770 including sensors for sensing various data related to the operation and status of the moving robot 1.

The sensor unit 770 may include an obstacle detecting sensor that detects an obstacle. In this connection, the obstacle detection sensor may include an infrared sensor, an ultrasonic sensor, an RF (radio frequency) sensor, a geomagnetic sensor, a PSD (Position Sensitive Device) sensor, and the like. In particular, in accordance with the present disclosure, the obstacle detection sensor includes the ultrasonic sensor 333 and the RGBD sensor 321 shown in FIG. 1.

Further, the sensor unit 770 may include a lidar (light detection and ranging). The lidar may detect an object such as an obstacle based on a TOF (time of flight) of a transmission signal and a reception signal or a phase difference phase difference between a transmission signal and a reception signal using a laser beam. Further, the lidar may detect a distance to the object, a velocity relative to the object, and a position of the object.

In one example, the obstacle detection sensor detects an object in the moving direction of the mobile robot, in particular, an obstacle, and transmits obstacle information to the controller 740. The controller 740 may control movement of the moving robot 1 according to the detected position of the obstacle.

The sensor unit 770 may further include a motion detection sensor that detects a motion of the moving robot 1 and outputs motion information. The motion detection sensor may include a gyro sensor, a wheel sensor, and an acceleration sensor.

The gyro sensor detects a direction of rotation and an angle of rotation when the moving robot 1 travels. The gyro sensor detects an angular velocity of the moving robot 1 and outputs a voltage value proportional to the angular velocity. The controller 740 calculates the rotation direction and the rotation angle of the moving robot 1 using a voltage value output from the gyro sensor.

The wheel sensor is connected to the wheel included in the driving unit 760 to sense the number of revolutions of the wheel. The controller 740 may calculate a rotation speed of the wheel using the number of the revolutions sensed by the wheel sensor. Further, the controller 740 may calculate an rotation angle using a difference between the rotation speeds of the wheels.

The acceleration sensor detects a change in velocity of the moving robot 1. The acceleration sensor may be attached to the wheel to detect wheel slip or idle rotation.

Further, the acceleration sensor may be built into the controller 740 to detect change in the velocity of the moving robot 1. That is, the acceleration sensor detects an impact amount according to the change in the velocity and outputs a voltage value corresponding thereto.

The controller 740 may calculate a position change of the moving robot 1 based on the motion information output from the motion detection sensor.

Hereinafter, an example in which a moving robot according to an embodiment of the present disclosure travels around a waiting line formed at a departure examination hall of an airport will be described. However, the moving robot in accordance with the present disclosure may operate the same manner in other places, such as airport immigration desks and security checkpoints. Further, the moving robot according to the present disclosure may operate in the same manner in other places where waiting lines are formed, such as train stations, harbors, department stores, marts, and performance halls, other than the airport.

Figure 4:
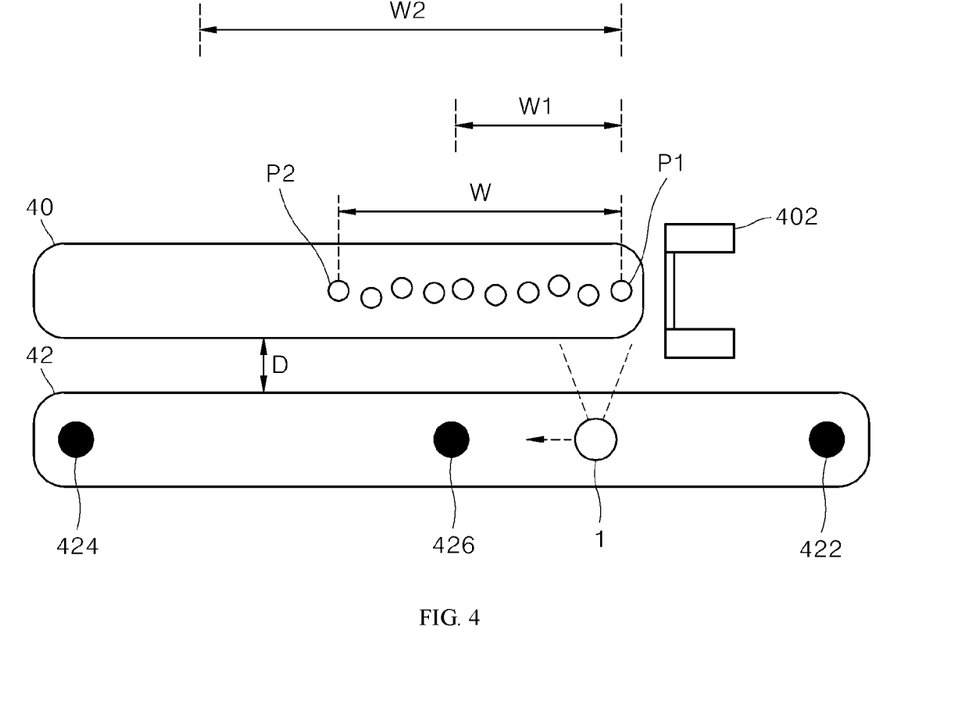
FIG. 4 illustrates a moving region in which a moving robot moves and a waiting line region adjacent to the moving region according to an embodiment of the present disclosure.

FIG. 4 illustrates a moving region in which a moving robot moves and a waiting line region adjacent to the moving region according to an embodiment of the present disclosure.

Referring to FIG. 4, the moving robot 1 according to an embodiment of the present disclosure runs in a predefined moving region 42. A moving start point 422 and a moving end point 424 of the moving robot 1 are defined in the moving region 42.

In another embodiment of the present disclosure, the moving start point 422 may be set to correspond to a start point P1 of a waiting line formed in the waiting line region 40. In another example, the moving start point 422 may be set to correspond to a location of the departure examination desk 402.

The moving robot 1 starts moving from the moving start point 422 to the moving end point 424. In one embodiment of the present disclosure, when an end point of the waiting line formed in the waiting line region 40 is detected while the moving robot 1 is moving from the moving start point 422 to the moving end point 424, the robot 1 may immediately stop and return to the moving start point 422 even when the robot 1 does not reach the moving end point 424.

Further, in one embodiment of the present disclosure, when the end point of the waiting line is not detected while the moving robot 1 moves from the moving start point 422 to the moving end point 424, the robot 1 may reach the moving end point 424, and then may return to the moving start point 422.

Although the moving region 42 is formed in a straight line in the embodiment of FIG. 4, the moving region 42 may be formed in a curved shape or in a zig-zag manner.

Referring back to FIG. 4, the waiting line region 40 is defined around the moving region 42. In the waiting line region 40, a waiting line of waiting people who wish to be subjected to a departure examination may extend from the departure examination desk 402. According to an embodiment, the waiting line region 40 may be formed in front of a checkout counter, an entrance of a concert hall, and the like, instead of the departure examination desk 402.

As shown in FIG. 4, the waiting line region 40 and the moving region 42 may be defined to be spaced apart from each other by a predetermined distance D. In accordance with the present disclosure, a distance between the waiting line region 40 and moving region 42 may refer to a spacing between the moving robot 1 and the waiting people forming the waiting line.

Referring to FIG. 3 and FIG. 4, first, the controller 740 controls the driving unit 760 to move the moving robot 1 toward the moving end point 424 from the moving start point 422.

When the moving robot 1 starts moving from the moving start point 422 to the moving end point 424, the controller 740 acquires the waiting line region image by photographing the waiting line region 40 using the image acquisition unit 720.

The controller 740 detects a shape of a person from the waiting line region image acquired through the image acquisition unit 720 when the moving robot 1 passes by the start point of the waiting line region 40, thereby to detect a first waiting person. The controller 740 sets a position of the first waiting person as detected to be the start point P1 of the waiting line formed in the waiting line region 40.

The controller 740 continuously detects each waiting person in the waiting line based on the waiting line region image acquired through the image acquisition unit 720 while the moving robot 1 is moving. The controller 740 may count and store a total number of waiting persons each time a new waiting person is detected.

When the moving robot 1 approaches the end point of the waiting line formed in waiting line region 40, the controller 740 detects a last waiting person of the waiting line from the waiting line region image acquired through the image acquisition unit 720. The controller 740 sets a position of the last waiting person as detected to be the end point P2 of the waiting line formed in the waiting line region 40.

When the end point P2 of the waiting line formed in the waiting line region 40 is detected, the controller 740 controls the driving unit 760 to stop the moving robot 1. Because the end point P2 of the waiting line may not necessarily coincide with the moving end point 424 of the moving region 42, the moving robot 1 may stop moving before reaching the moving end point 424.

Further, when the end point P2 of the waiting line is formed at a position outside the waiting line region 40, the moving robot 1 may stop at the moving end point 424.

Next, the controller 740 calculates a length W of the waiting line using the start point P1 of the waiting line and the end point P2 of the waiting line as detected above. For example, the controller 740 may calculate a difference between an absolute coordinate of the start point P1 of the waiting line and an absolute coordinate of the end point P2 of the waiting line to calculate the length W of the waiting line.

The controller 740 may compare the calculated waiting line W length with predefined reference values W1 and W2 to and set the operation mode of the moving robot 1 based on the comparison result.

For example, the controller 740 may compare the calculated waiting line length W with a predefined first reference value W1. When, from the result of the comparison, the length W of the waiting line is smaller than or equal to the first reference value W1, the controller 740 sets the operation mode of the moving robot 1 to an usual mode. On the contrary, when the length W of the waiting line exceeds the first reference value W1, the controller 740 sets the operation mode of the moving robot 1 to a guide mode.

In another example, the controller 740 compares the calculated waiting line length W with the predefined first reference value W1 and a second reference value W1. In this connection, the first reference value W1 is set to be smaller than the second reference value W1.

When, from the result of the comparison, the length W of the waiting line is smaller than or equal to the first reference value W1, the controller 740 sets the operation mode of the moving robot 1 to the usual mode. When, from the result of the comparison, the length W of the waiting line exceeds the first reference value W1 and is smaller than or equal to the second reference value W2, the controller 704 sets the operation mode of the moving robot 1 to a first guide mode. When, from the result of the comparison, the length W of the waiting line exceeds the second reference value W2, the controller 704 sets the operation mode of the moving robot 1 to a second guide mode.

When the controller 740 has set the operation mode based on the waiting line length W, the controller 740 controls the driving unit 760 so that the moving robot 1 returns to the moving start point 422. The controller 740 controls the moving robot 1 to operate according to the previously set operation mode while returning to the moving start point 422 of the moving robot 1.

In an embodiment of the present disclosure, when the operation mode of the moving robot 1 is set to the usual mode, the controller 740 displays general information on the display 710. Further, the controller 740 outputs sound corresponding to the general information displayed on the display 710 through the sound output unit 780.

Figure 5:
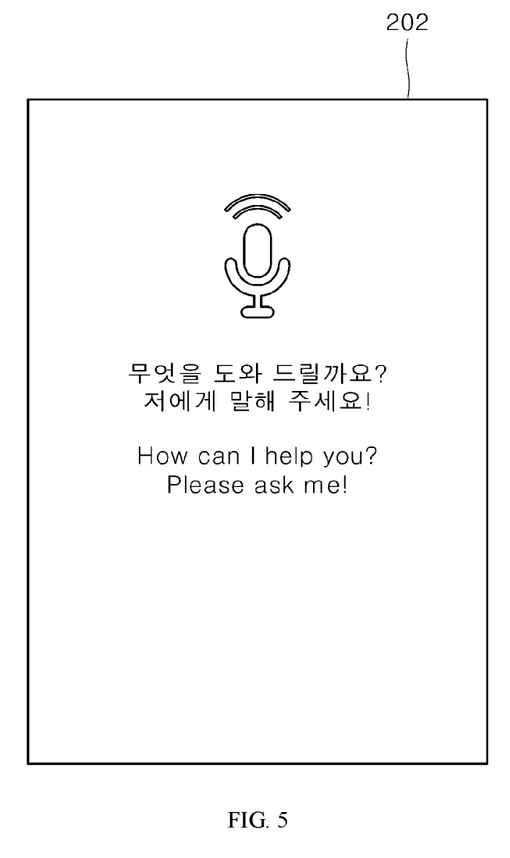
FIG. 5 shows general information shown on a display when a moving robot operates in an usual mode in accordance with one embodiment of the present disclosure.

In accordance with the present disclosure, the general information means information that is not directly related to the waiting purpose of the waiting person in the waiting line. In the embodiment of FIG. 4, the waiting person waits for departure examination. In this case, the general information means other information that is not directly related to the departure examination as the waiting purpose of the waiting person. At this time, the controller 740 displays voice command input request information to request the user to input a voice command on a screen 202 of the display 710 as shown in FIG. 5.

That is, in accordance with the present disclosure, the controller 740 determines that a congestion of the waiting line is not high when the length W of the waiting line is smaller than or equal to the first reference value W1. In this case, the controller 740 control the moving robot 1 to operate in the usual mode, such that a waiting people or other users who are not in the waiting line may freely use the robot 1.

Figure 6:
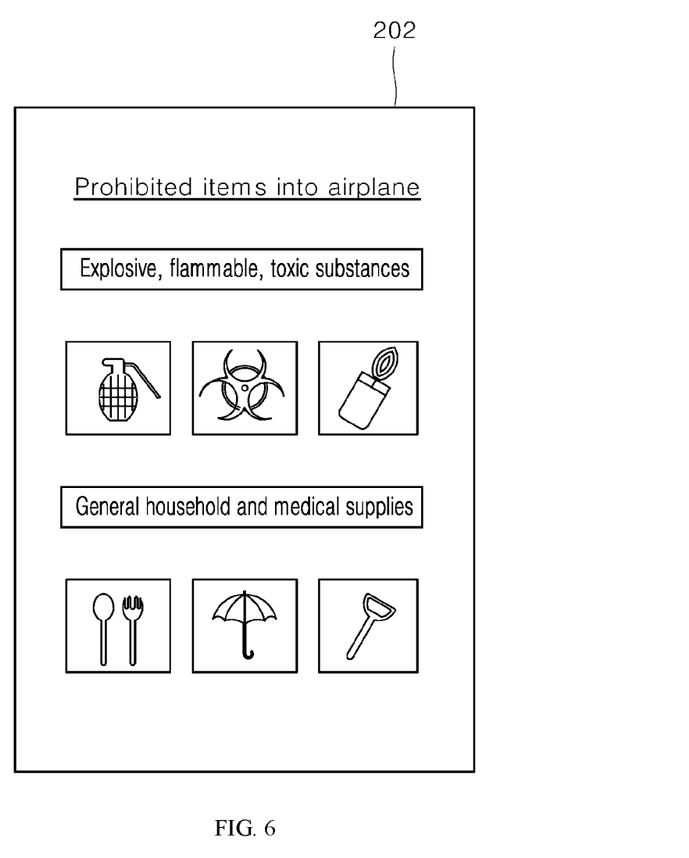
FIG. 6 shows a waiting guide information displayed on a display when a moving robot is operating in a guide mode in accordance with one embodiment of the present disclosure.

In one embodiment of the present disclosure, when the operation mode of the moving robot 1 is set to the guide mode, the controller 740 displays predetermined waiting guide information on the display 710. Further, the controller 740 outputs a sound corresponding to the waiting guide information displayed on the display 710 through the sound output unit 780.

In accordance with the present disclosure, the waiting guide information refers to information that is directly related to the waiting purpose of the waiting person in the waiting line. In the example shown in FIG. 4, the waiting person waits for the departure examination as the waiting purpose. In this case, the waiting guide information means information directly related to the departure examination as the waiting purpose of the waiting person. In this case, the controller 740 may display "prohibited items into aircraft" information on the screen 202 of the display 710 as shown in FIG. 6. In another example, the controller 740 may display information on items to be prepared by the waiting person for the departure inspection process on the screen 202 of the display 710.

That is, in accordance with the present disclosure, the controller 740 determines that the congestion of the waiting line is high when the length W of the waiting line exceeds the first reference value W1. When the congestion of the waiting line is high, the moving robot 1 provides information directly related to the waiting purpose of the waiting person. Thus, the waiting purpose (for example, departure check) may be achieved more quickly and the waiting line congestion may be reduced more quickly.

Further, in one embodiment of the present disclosure, when the operation mode of the moving robot 1 is set to the guide mode, the controller 740 controls the moving robot 1 to stop and stay at a waiting guide point 426 for a predefined waiting guide time duration (e.g., 1 minute). Accordingly, while the moving robot 1 stays for the waiting guide time duration at the waiting guide point 426, the robot 1 displays the waiting guide information as shown in FIG. 6 on the display 710.

In this connection, the waiting guide point 426 may be set to correspond to various points such as a middle point of the waiting line or the end point P2 of the waiting line.

Thus, in accordance with the present disclosure, when the congestion of the waiting line is high, the moving robot 1 may provide the waiting guide information to waiting people or users who want to join the waiting line while the moving robot 1 stops near the waiting line and stays for a certain time duration. As a result, the waiting purpose may be achieved more quickly, thereby reducing the congestion of the waiting line quickly.

Further, in accordance with the present disclosure, when the operation mode of the moving robot 1 is set to the guide mode, the controller 740 reduces the distance D between the waiting line and the moving robot. Accordingly, the moving robot 1 more closely approaches the waiting people in the waiting line and then provides the waiting guide information as shown in FIG. 6 on the display 710.

That is, in accordance with the present disclosure, the distance between the moving robot 1 and the waiting line may vary based on whether the operation mode is the usual mode or the guide mode. When the moving robot 1 operates in the guide mode, the robot 1 keeps closer to the waiting person than in the usual mode such that the robot may call attention to allow a waiting person to focus on the waiting guide information.

In one example, as described above, the controller 740 may divide the guide mode into the first guide mode and the second guide mode. For example, when it is determined that the waiting line is congested because the length W of the waiting line exceeds the first reference value W1, the congested state of the waiting line may be divided into a slightly congested state of the waiting line and a highly congested state of the waiting line based on comparison with an additional reference value (e.g., the second reference value W2). In the slightly congested state of the waiting line, the length of the waiting line W exceeds the first reference value W1 and is smaller than or equal to the second reference value W2. In the highly congested state of the waiting line, the length W of the waiting line exceeds the second reference value W2. According to an exemplary embodiment, the congestion level may be further subdivided based on a further reference value such as a third reference value or a fourth reference value.

The controller 740 may control the operation of the moving robot 1 differently based on the first guide mode and the second guide mode. For example, in the first guide mode, the moving robot 1 may stay at the waiting guide point 426 for a waiting guide time duration. Further, in the second guide mode, the moving robot 1 may provide the waiting guide information while keeping a distance from the waiting line to be shorter than in the first guide mode or the usual mode. This is merely an example. Thus, the operation of the moving robot 1 may vary based on the operation modes according to embodiments.

Figure 7:
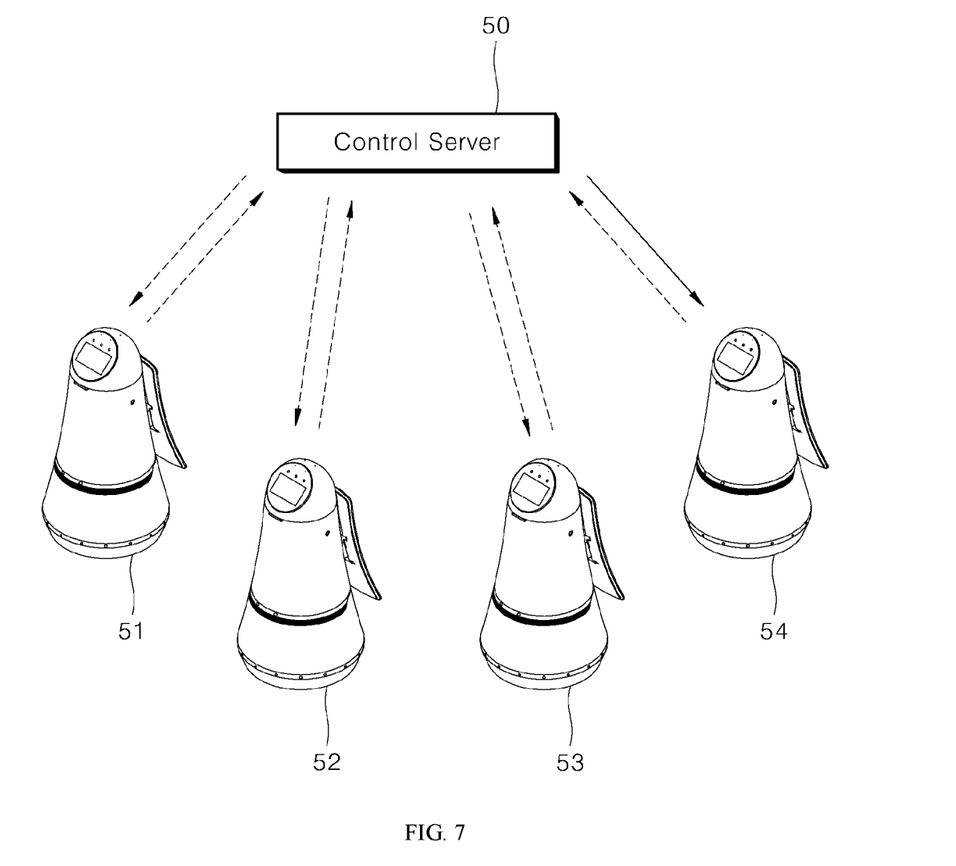
FIG. 7 illustrates a network configuration between a plurality of moving robots and a control server according to an embodiment of the present disclosure.

FIG. 7 illustrates a network configuration between a plurality of moving robots and a control server according to an embodiment of the present disclosure.

As shown in FIG. 7, a number of moving robots 51 to 54 according to the present disclosure may exchange data with a control server 50 through the communication unit 790, respectively.

In particular, in accordance with the present disclosure, each of the moving robots 51 to 54 provides, to the control server 50, information on the length of each waiting line as calculated using the start point P1 and the end point P2 of the waiting line or the number of the waiting persons belonging to each waiting line.

When the control server 50 receives the information about the length of the waiting line or the number of waiting persons belonging to each waiting line from each moving robot 51 to 54 the control server 50 may generate, based on the received information, waiting line information as information on the congestion of each waiting line corresponding to each of the moving robots 51 to 54.

According to an embodiment, each of the moving robots 51 to 54 may transmit information about the length of each waiting line or information about the number of waiting persons belonging to each waiting line to another moving robot. Each of the moving robots 51 to 54 may generate waiting line information based on the information on the length of waiting lines or information on the number of waiting persons belonging to each waiting line as transmitted from another moving robot.

The control server 50 transmits the generated waiting line information to each of the moving robots 51 to 54. Accordingly, each of the moving robots 51 to 54 may display the waiting line information regarding the congestion of the corresponding waiting line and the congestion of another waiting line on the display 710.

Figure 8:
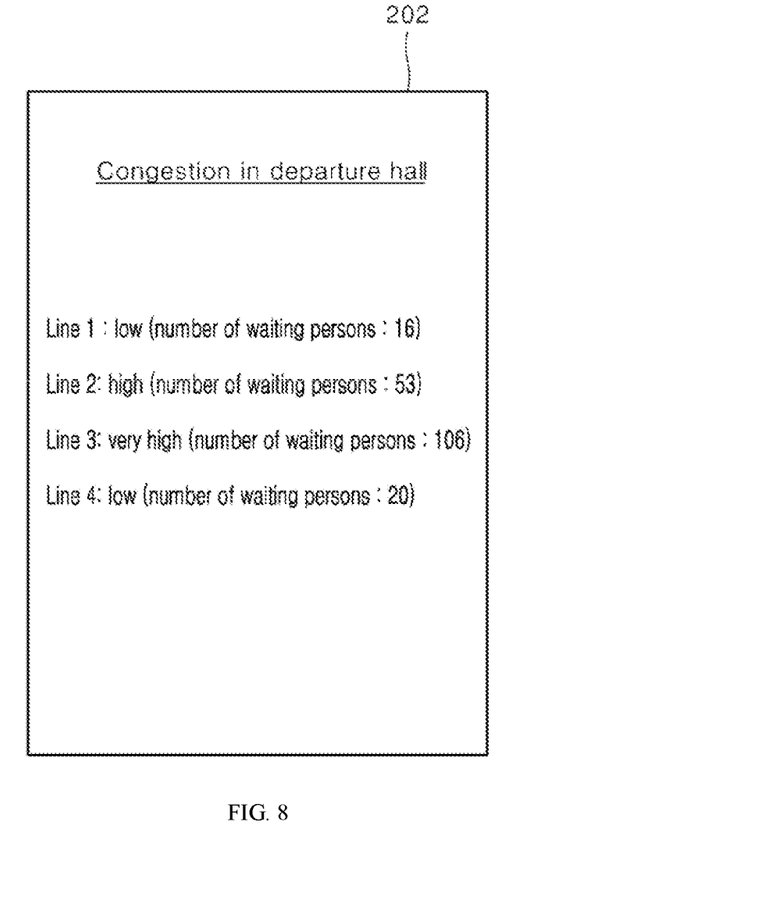
FIG. 8 shows waiting line information displayed on a display when a moving robot operates in a guide mode in accordance with one embodiment of the present disclosure.

For example, as shown in FIG. 8, the controller 740 displays the information about the congestion of each waiting line on the screen 202 of the display 710 through the communication unit 790. As described above, the controller 740 may display the congestion of each waiting line on the screen 202 in a number or a graph form based on the received waiting line information.

The waiting line information as shown in FIG. 8 may be provided only in either the usual mode or the guide mode, or may be provided in both the usual mode and the guide mode.

As such, in accordance with the present disclosure, the moving robot in charge of each waiting line may accurately determine the length of each waiting line or the number of waiting persons in each waiting line.

Further, in accordance with the present disclosure, the robot may generate information about the congestions of all of the waiting lines by collecting information about the waiting lines as identified by the moving robots. The information about the congestions of all of the waiting lines as generated in this way may be transmitted back to each moving robot. Accordingly, each moving robot may accurately provide the congestions of all of the waiting lines to the waiting person or the user who wants to join the waiting line. Thus, the user may easily identify less congested waiting lines, thereby reducing a difference between congestions of all of the waiting lines and more uniformly distributing the users.

Figure 9:
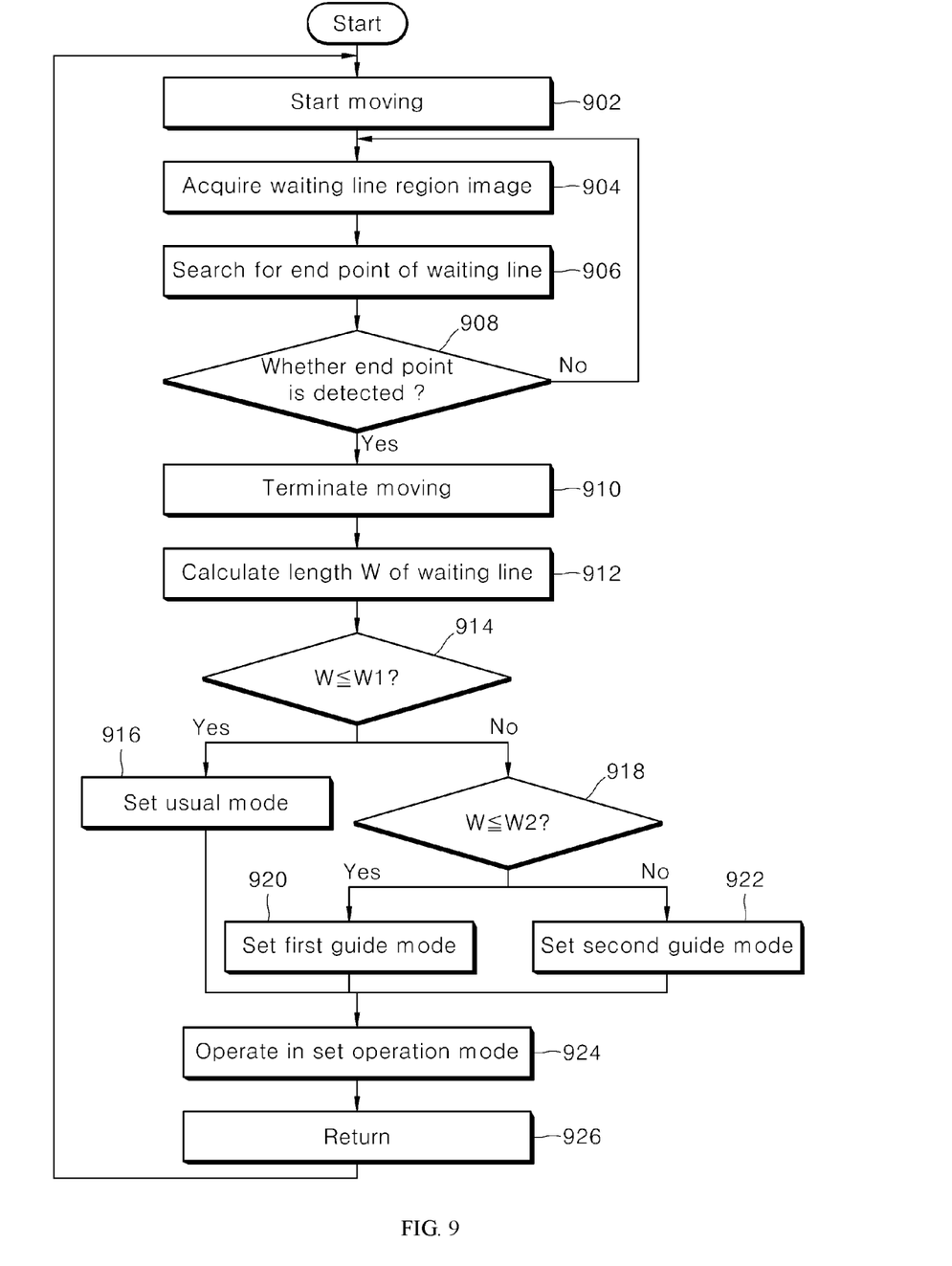
FIG. 9 is a flowchart illustrating a method of operating a moving robot according to an embodiment of the present disclosure.

FIG. 9 is a flowchart illustrating a method of operating a moving robot according to an embodiment of the present disclosure.

Referring to FIG. 9, the controller 740 of the moving robot 1 first controls the driving unit 760 to move the moving robot 1 from the moving start point 422 toward the moving end point 424. Accordingly, the moving robot 1 starts moving toward the moving end point 424 902.

The moving robot 1 acquires the waiting line region image by shooting the waiting line region through the image acquisition unit 720 while moving toward the moving end point 424 904.

The controller 740 may recognize each waiting person in the acquired waiting line region image and determine the number of waiting people therein. In this process, the controller 740 may identify the start point of the waiting line. Further, controller 740 may search for the end point of the waiting line in this process 906.

When recognizing the last waiting person in the waiting line from the waiting line region image, the controller 740 determines a location of the last waiting person as the end point of the waiting line. When the waiting line end point is not detected 908, the controller 740 continues to perform the waiting line image acquisition 904 and the waiting line end point search 906.

When the waiting line end point is detected 908, the controller 740 controls the driving unit 760 such that the moving robot 1 stops moving toward the moving end point 424. Then, controller 740 calculates the length W of the waiting line using the start point and end point of the waiting line as detected earlier 912.

The controller 740 compares the calculated waiting line length W with the predefined first reference value W1 914. When, from a result of the comparison, the waiting line length W is smaller than or equal to the first reference value W1, the controller 740 sets the operation mode of the moving robot 1 to the usual mode 916.

When, from the result of the comparison, the length W of the waiting line exceeds the first reference value W2, the controller 740 sets the operation mode of the moving robot 1 to the guide mode. When the operation mode of the moving robot 1 is determined as the guide mode, the controller 740 compares the length W of the waiting line W with the second reference value W2 918. In some embodiments, the comparison between the waiting length W and the second reference value W2 may not be performed.

When, from a result of the comparison, the length W of the waiting line is smaller than or equal to the second reference value W2, the controller 740 sets the operation mode of the moving robot 1 to the first guide mode. When, from the result of the comparison, the length W of the waiting line exceeds the second reference value W2, the controller 740 sets the operation mode of the moving robot 1 to the second guide mode.

When the operation mode setting of the moving robot 1 is completed, the controller 740 controls the moving robot 1 so that the moving robot 1 performs a specified operation corresponding to each set operation mode.

For example, when the operation mode of the moving robot 1 is set to the usual mode, the controller 740 may control to display the general information on the display 710.

In another example, when the operation mode of the moving robot 1 is set to the first guide mode, the controller 740 may control the moving robot 1 to stay at the waiting guide point 426 for a predefined waiting guide time while displaying the waiting guide information on the display 710.

In another example, when the operation mode of the moving robot 1 is se to the second guide mode, the controller 740 may set the distance D between the moving robot 1 and the waiting line to be shorter than in the usual mode or the first guide mode and may display the waiting guide information on the display 710.

In still another example, when the operation mode of the moving robot 1 is set to the guide mode without comparing the waiting line length W and the second reference value W2 with each other, the controller 740 sets the distance D between the moving robot 1 and the waiting line to be shorter than in the usual mode. In this case, while the moving robot 1 stays at the waiting guide point 426 for a predefined waiting guide time, the display 710 may display the waiting guide information thereon.

The controller 740 controls the driving unit 760 such that the moving robot 1 returns to the moving start point 422 while operating according to each operation mode as described above 924. Accordingly, the moving robot 1 returns to the moving start point 422 926. The moving robot 1 returning to the moving start point 422 may repeatedly perform 902 to 924.

Details of the present disclosure as described above may be variously substituted, modified, and changed by a person having ordinary knowledge in a technical field to which the present disclosure belongs without departing from a technical spirit of the present disclosure. Thus, the present disclosure is not limited to the accompanying drawings.

What is claimed is:

1. A method for operating a moving robot, the method comprising:
   moving on a first path from a predefined start point toward a predefined end point, wherein the first path is adjacent to a waiting line;
   acquiring at least one image of the waiting line during the moving;
   detecting an end point of the waiting line based on the acquired at least one image;
   setting an operation mode of the moving robot based on a length of the waiting line calculated using the detected end point of the waiting line; and
   operating in the set operation mode along a second path adjacent to the waiting line.

2. The method of claim 1, wherein the first path is separated from the waiting line by a first distance and the second path is separated from the waiting line by a second distance different than the first distance.

3. The method of claim 2, wherein the second distance is less than the first distance.

4. The method of claim 1, wherein the moving continues to the predefined end point after detecting the end point of the waiting line.

5. The method of claim 1, wherein the set operation mode corresponds to a first operation mode when the length of the waiting line exceeds a predetermined threshold and corresponds to a second operation mode when the length of the waiting line does not exceed the predetermined threshold.

6. The method of claim 5, wherein the first operation mode corresponds to a guide mode and the second operation mode corresponds to a normal operation mode.

7. The method of claim 5, wherein the first path is separated from the waiting line by a first distance and the second path is separated from the waiting line by a second distance different than the first distance, and
   wherein the second distance is varied based on the first operation mode or the second operation mode.

8. The method of claim 5, wherein the second operation mode comprises providing waiting line information generated based on the length of the waiting line or a length of another waiting line.

9. The method of claim 6, wherein when the set operation mode is the guide mode, the method further comprises stopping movement of the moving robot at a predefined waiting guide point for a predefined waiting guide time and providing waiting guide information.

10. The method of claim 6, wherein when the set operation mode is the guide mode, the method further comprises reducing a distance between the second path and the waiting line.

11. A moving robot comprising:
a camera;
a driving unit; and
a controller configured to:
- control the driving unit to move the moving robot on a first path from a predefined start point toward a predefined end point, wherein the first path is adjacent to a waiting line;
- acquire, via the camera, at least one image of the waiting line during the moving;
- detect an end point of the waiting line based on the acquired at least one image;
- set an operation mode of the moving robot based on a length of the waiting line calculated using the detected end point of the waiting line; and
- control the moving robot to operate in the set operation mode along a second path adjacent to the waiting line.

12. The moving robot of claim 11, wherein the first path is separated from the waiting line by a first distance and the second path is separated from the waiting line by a second distance different than the first distance.

13. The moving robot of claim 12, wherein the second distance is less than the first distance.

14. The moving robot of claim 11, wherein the controller is further configured to control the driving unit to continue moving the moving robot to the predefined end point after detecting the end point of the waiting line.

15. The moving robot of claim 11, wherein the set operation mode corresponds to a first operation mode when the length of the waiting line exceeds a predetermined threshold and corresponds to a second operation mode when the length of the waiting line does not exceed the predetermined threshold.

16. The moving robot of claim 15, wherein the first operation mode corresponds to a guide mode and the second operation mode corresponds to a normal operation mode.

17. The moving robot of claim 15, wherein the first path is separated from the waiting line by a first distance and the second path is separated from the waiting line by a second distance different than the first distance, and
wherein the second distance is varied based on the first operation mode or the second operation mode.

18. The moving robot of claim 15, wherein the controller is further configured to provide waiting line information generated based on the length of the waiting line or a length of another waiting line when the moving robot is in the second operation mode.

19. The moving robot of claim 16, wherein when the set operation mode is the guide mode, the controller:
- controls the driving unit to stop movement of the moving robot at a predefined waiting guide point for a predefined waiting guide time; and
- provides waiting guide information.

20. The moving robot of claim 16, wherein when the set operation mode is the guide mode, the controller reduces a distance between the second path and the waiting line.

* * * * *